(12) United States Patent
Iwai et al.

(10) Patent No.: US 12,122,540 B2
(45) Date of Patent: Oct. 22, 2024

(54) SPACE VEHICLE AND CAPTURE SYSTEM

(71) Applicant: Astroscale Japan Inc., Tokyo (JP)

(72) Inventors: Takashi Iwai, Tokyo (JP); Kenji Sagara, Tokyo (JP); Sho Fujita, Tokyo (JP)

(73) Assignee: ASTROSCALE JAPAN INC., Tokyo (JP)

( * ) Notice: Subject to any disclaimer, the term of this patent is extended or adjusted under 35 U.S.C. 154(b) by 11 days.

(21) Appl. No.: 18/249,201

(22) PCT Filed: Oct. 6, 2021

(86) PCT No.: PCT/JP2021/036972
§ 371 (c)(1),
(2) Date: Apr. 14, 2023

(87) PCT Pub. No.: WO2022/080208
PCT Pub. Date: Apr. 21, 2022

(65) Prior Publication Data
US 2023/0406546 A1 Dec. 21, 2023

(30) Foreign Application Priority Data
Oct. 16, 2020 (JP) ................. 2020-174312

(51) Int. Cl.
*B64G 1/64* (2006.01)
*B64G 1/10* (2006.01)
*B64G 4/00* (2006.01)

(52) U.S. Cl.
CPC ............... *B64G 4/00* (2013.01); *B64G 1/10* (2013.01); *B64G 1/646* (2013.01)

(58) Field of Classification Search
CPC .... B64G 1/1078; B64G 1/1081; B64G 1/366; B64G 1/646; B64G 1/6462; B64G 1/6464
See application file for complete search history.

(56) References Cited

U.S. PATENT DOCUMENTS 3,794,270 A * 2/1974 Wilkens ................. B64G 1/646
244/172.4
4,500,057 A * 2/1985 Duwelz ................. B64G 1/646
244/172.4

(Continued)

FOREIGN PATENT DOCUMENTS

CN 105711859 A 6/2016
CN 109466808 A 3/2019

(Continued)

OTHER PUBLICATIONS

Robert Axthelm, et al., "Net Capture Mechanism for Debris Removal Demonstration Mission", 7th European Conference on Space Debris, the ESA Space Debris Office, 1633417263525_0, Jun. 2017 https://conference.sdo.esoc.esa.int/proceedings/sdc7/paper/78.

*Primary Examiner* — Richard Green
(74) *Attorney, Agent, or Firm* — Mintz Levin Cohn Ferris Glovsky and Popeo, P.C.

(57) ABSTRACT

Provided is a space vehicle that includes: a main body; a movable portion configured to reciprocate in an axial direction with respect to the main body; and a magnetic force generation unit attached to a distal end of the movable portion, and attracts, by a magnetic force, a platelike body attached to an object in outer space. The magnetic force generation unit includes: a magnet support member attached to a distal end of the movable portion via a buffer elastic body; and a plurality of permanent magnets laid on a surface of the magnet support member to form an attraction region. When a drive unit moves the movable portion away from the main body, the attraction region protrudes from the main body while maintaining a fixed orientation crossing the axial direction, and is changeable in position and/or orientation by the buffer elastic body when an external force is applied.

11 Claims, 10 Drawing Sheets

(56) References Cited

U.S. PATENT DOCUMENTS

| | | |
|---|---|---|
| 5,145,227 A | 9/1992 | Monford, Jr. |
| 7,374,134 B2 | 5/2008 | Collyer et al. |
| 2007/0210212 A1 | 9/2007 | Tchoryk et al. |

FOREIGN PATENT DOCUMENTS

| | | | | |
|---|---|---|---|---|
| CN | 213109852 U | | 5/2021 | |
| CN | 114701674 A | * | 7/2022 | |
| JP | S58-142000 A | | 8/1983 | |
| JP | 5951026 B2 | | 7/2016 | |
| JP | 2020-165524 A | | 10/2020 | |
| WO | WO-2018189633 A1 | * | 10/2018 | ............. B64G 1/648 |

* cited by examiner

Fig. 9
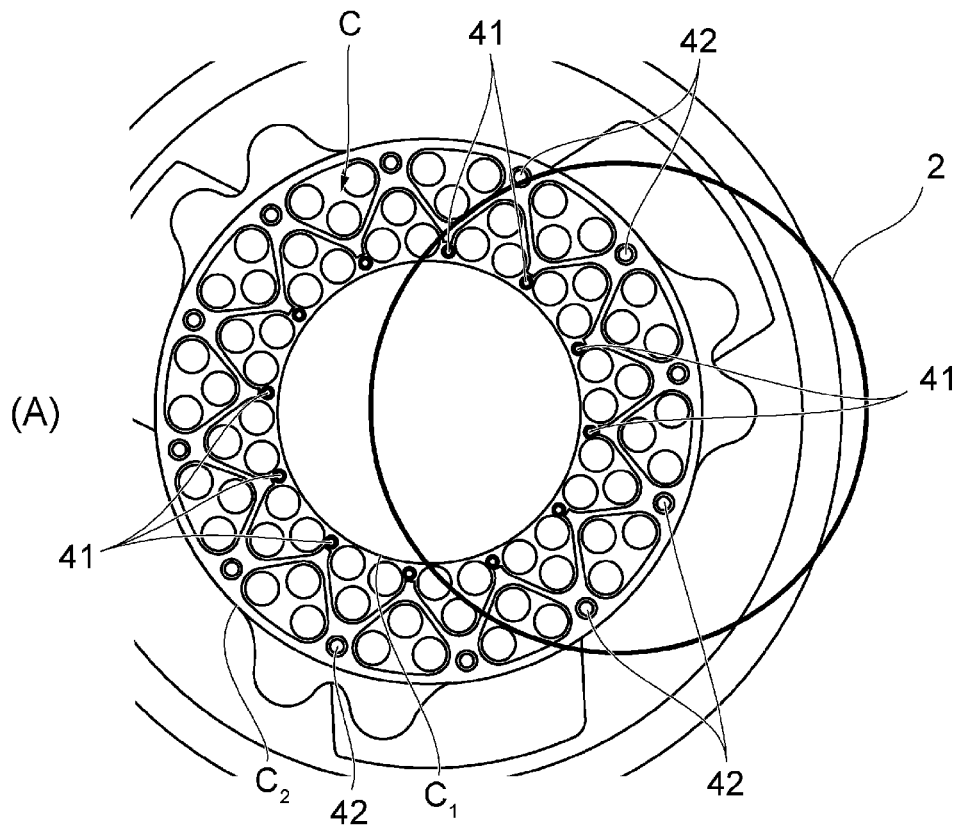
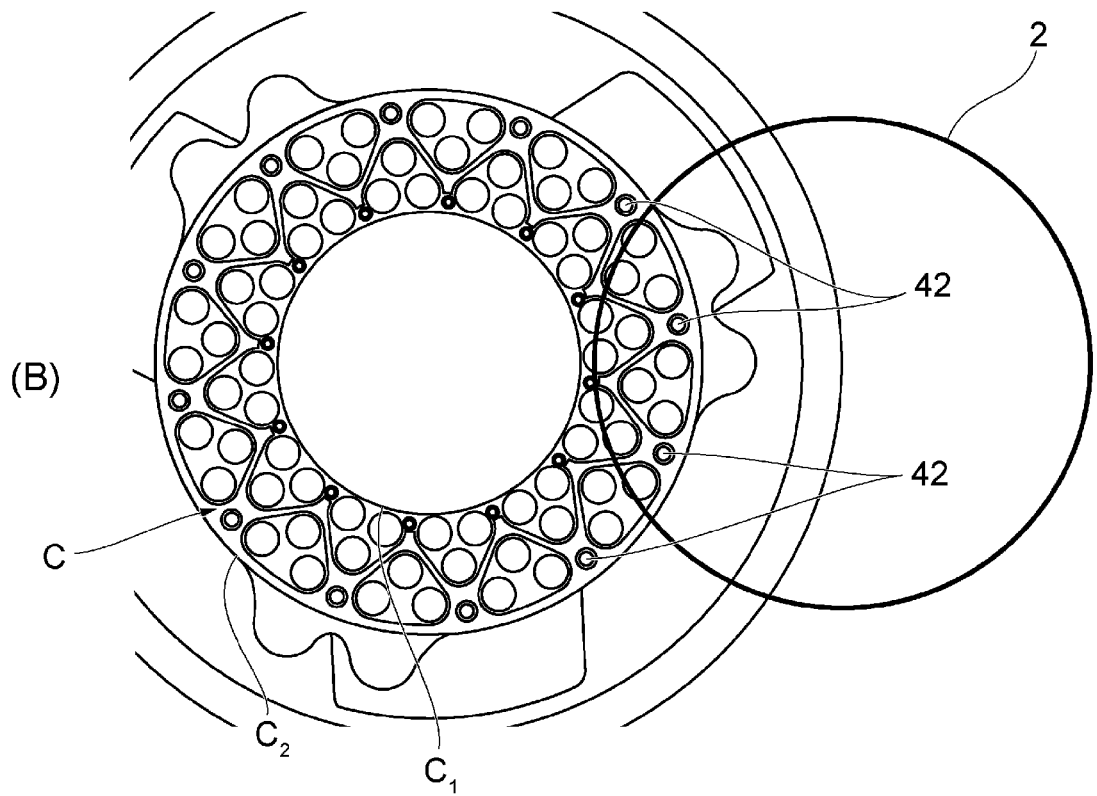

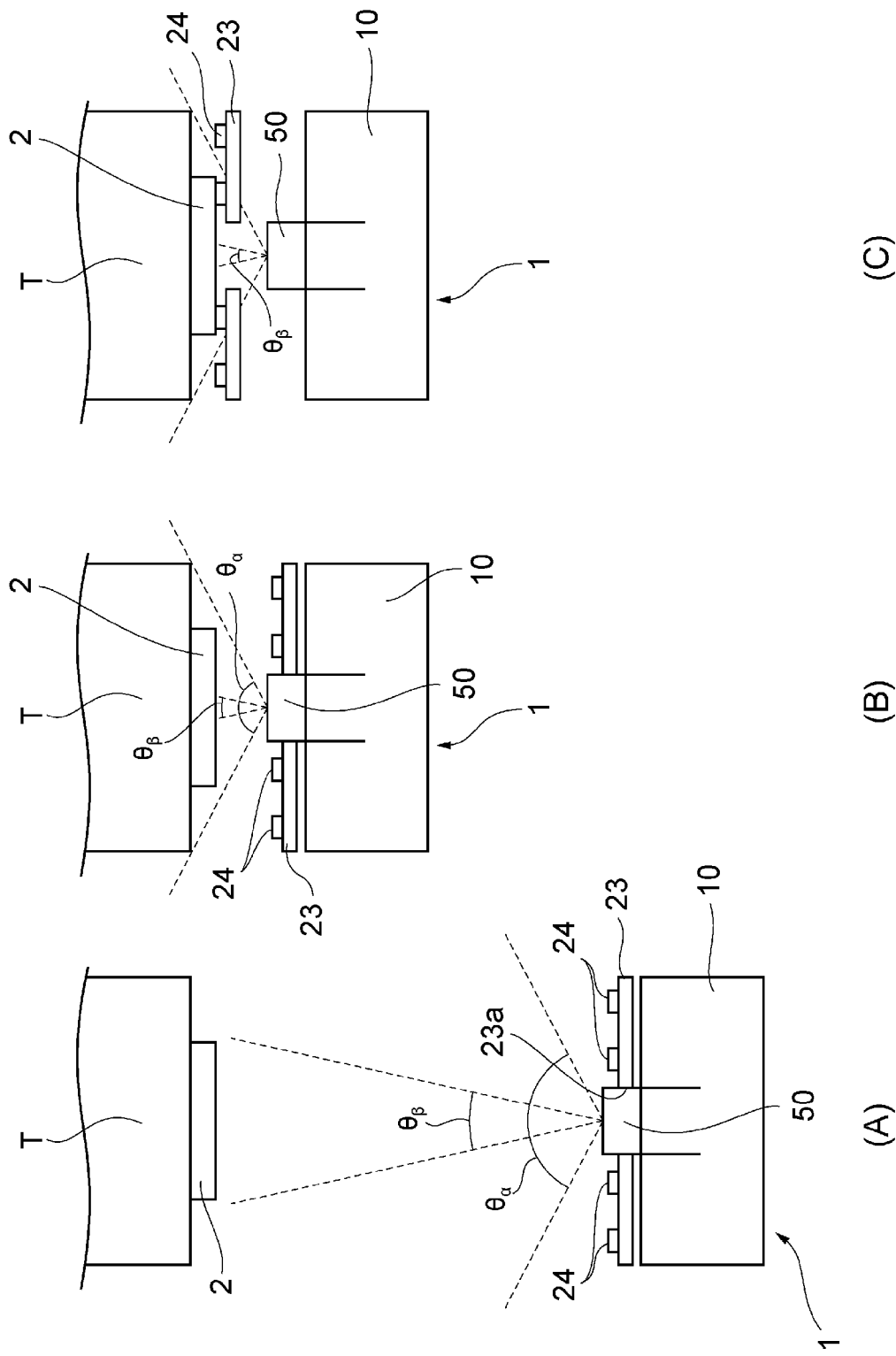

SPACE VEHICLE AND CAPTURE SYSTEM

CROSS-REFERENCE TO RELATED APPLICATIONS

This application is a National Stage Application filed under 35 U.S.C. § 371 of International Patent Application No. PCT/JP2021/036972, filed on Oct. 6, 2021, which claims the benefit of Japanese Patent Application No. 2020-174312, filed on Oct. 16, 2020, which is hereby incorporated by reference herein in its entirety.

TECHNICAL FIELD

The present invention relates to a space vehicle and a capture system.

BACKGROUND ART

Services to remove space debris, which is becoming a threat to space utilization, are expected to develop in recent years. On-orbit services are also expected to develop in the future. Hence, the development of capture operation technology for safely docking spacecrafts is underway. If a malfunction occurs during the capture operation and the spacecrafts collide with each other, the spacecrafts may be damaged and an accident in which the damaged parts are scattered in various orbits may occur. The costs of removing parts in space are far greater than those on the earth, and such a situation needs to be avoided.

As conventional technologies for capture spacecrafts, for example, a magnetic method using an electromagnet and the like (Patent Document 1), a high-rigidity mechanical method using a robot arm and the like (Patent Document 2), a low-rigidity mechanical method using a net or cloth (Non-Patent Document 1), and a chemical method using an adhesive (Patent Document 3) have been proposed.

CITATION LIST

Patent Document

Patent Document 1: the specification of U.S. Pat. No. 5,145,227
Patent Document 2: Japanese Patent No. 5951026
Patent Document 3: the specification of U.S. Pat. No. 7,374,134

Non-Patent Document

Non-Patent Document 1: Robert Axthelm, et al., "Net Capture Mechanism for Debris Removal Demonstration Mission", 7th European Conference on Space Debris, the ESA Space Debris Office, 1633417263525_0, June 2017

SUMMARY

Technical Problem

The operation of docking spacecrafts consists of three phases: (1) phase up to capture, (2) phase to maintain the docking, and (3) phase to undo the docking. Capture technology is required to ensure safety continuously in each phase. The conventional capture technologies, however, have the following problems.

The magnetic method disclosed in Patent Document 1 has a problem in phase (1). With magnetic capture technology, the accuracy required for the relative positions and orientations of spacecrafts is high. For successful capture operation (mission), complex decisions need to be made at the time of mission start (i.e. strict parameter control and management are required). Magnetic capture technology also has a problem in phase (2). Since the magnetic method uses an electromagnet, constant energization is necessary in order to maintain the docking. To secure power supply to the electromagnet, the size of the power supply equipment of the capture spacecraft increases. Moreover, if power supply stops due to a malfunction of the capture spacecraft, unexpected release takes place.

The high-rigidity mechanical method disclosed in Patent Document 2 requires both accurate position and orientation measurement and accurate mechanism positioning and orientation adjustment during capture. The system configuration is therefore expected to be complex. A device for implementing such a method needs to include not only a sensor but also a six-degree-of-freedom control mechanism/motor. Such a mechanism itself is large and heavy. It is therefore difficult to mount such a device on a small satellite. If mounting on a small and lightweight satellite is possible, launching opportunities could increase and launching costs could be reduced. The use of such a method, however, makes it difficult to increase launching opportunities and achieve low-cost launching.

The low-rigidity mechanical method described in Non-Patent Document 1 and the chemical method using an adhesive or the like described in Patent Document 3 each have a problem in phase (3). With low-rigidity mechanical capture technology, capture cannot be redone. With capture technology using an adhesive or the like, peel-off after adhesion cannot be performed. Moreover, if a "harpoon" is used as in the capture technology described in Non-Patent Document 1, there is a possibility that fragments scatter at the time of penetration. Besides, accidentally penetrating a fuel tank or a battery may lead to an explosion.

The present invention has been made in view of such circumstances, and has an object of providing a space vehicle that, while having a relatively simple structure that can be reduced in size, can capture (and recapture) an object with no need for high-accuracy positioning (orientation adjustment).

Solution to Problem

To achieve the stated object, a space vehicle according to the present invention is a space vehicle configured to capture an object in outer space by attracting, by a magnetic force generated by a magnetic force generation unit, a platelike body that is attached to the object and is attracted by a magnetic force, the space vehicle including: a main body; a movable portion configured to reciprocate in a predetermined axial direction with respect to the main body; a drive unit configured to move the movable portion; and the magnetic force generation unit attached to a distal end of the movable portion which is an end farther from the main body, wherein the magnetic force generation unit includes: a magnet support member attached to the distal end of the movable portion via a buffer elastic body; and a plurality of permanent magnets laid on a tip part of the magnet support member to form a planar attraction region, and wherein when the drive unit moves the movable portion away from the main body in the axial direction, the attraction region of the magnetic force generation unit protrudes from the main body while maintaining a fixed orientation crossing the axial direction, and is changeable in position and/or orientation by the buffer elastic body in the case where an external force is applied.

A capture system according to the present invention is a capture system including: a platelike body that is attached to an object in outer space and is attracted by a magnetic force; and the space vehicle according to the present invention, wherein the capture system is configured to capture the object by the space vehicle.

With such a structure, when the drive unit moves the movable portion away from the main body in the axial direction, the planar attraction region of the magnetic force generation unit formed by laying the plurality of permanent magnets on the tip part of the magnet support member can protrude from the main body while maintaining a fixed orientation (orientation crossing the axial direction). Moreover, the attraction region is changeable in position and/or orientation by the buffer elastic body interposed between the movable portion and the magnet support member, in the case where an external force is applied. Therefore, even in the case where the attraction region of the space vehicle approaches the platelike body attached to the object in a non-parallel state or in the case where the attraction region is displaced (i.e. misaligned) with respect to the platelike body, by changing the orientation of the attraction region so as to be parallel to the platelike body, a specific range (a range set from the requirements of the attraction force, e.g. 80% of the entire attraction region) of the attraction region can be attracted (attached) to the platelike body. Hence, the space vehicle can capture the object with no need for high-accuracy positioning of the attraction region of the space vehicle with respect to the platelike body attached to the object. In addition, since the space vehicle is configured to capture the object by causing the attraction region of the magnetic force generation unit to attract to the platelike body attached to the object, the space vehicle is capable of recapture, and also its structure is relatively simple and can be reduced in size.

In the space vehicle according to the present invention, the drive unit may include: a drive elastic body configured to apply, to the movable portion, a predetermined biasing force for causing the movable portion to move away from the main body; a tensile force generation unit configured to apply, to the movable portion, a tensile force against the biasing force of the drive elastic body; and a control unit configured to control the tensile force of the tensile force generation unit. In such a case, the control unit may make the tensile force of the tensile force generation unit less than the biasing force of the drive elastic body to move the movable portion away from the main body, and make the tensile force of the tensile force generation unit greater than the biasing force of the drive elastic body to move the movable portion closer to the main body.

With such a structure, the control unit can make the tensile force of the tensile force generation unit less than the biasing force of the drive elastic body to move the movable portion away from the main body, and make the tensile force of the tensile force generation unit greater than the biasing force of the drive elastic body to move the movable portion closer to the main body. That is, the movable portion can be easily reciprocated simply by controlling the tensile force of the tensile force generation unit by the control unit.

In the space vehicle according to the present invention, the movable portion may be a first movable portion, and the drive elastic body may be a first drive elastic body configured to apply a first biasing force to the first movable portion. The space vehicle according to the present invention may include: a second movable portion to which the magnetic force generation unit is not attached and that is configured to reciprocate in the axial direction with respect to the main body; and a second drive elastic body configured to apply, to the second movable portion, a second biasing force for causing the second movable portion to move away from the main body, wherein the second biasing force is greater than the first biasing force. In such a case, the control unit may make the tensile force of the tensile force generation unit less than the first biasing force to move the first movable portion and the second movable portion away from the main body, attract the attraction region attached to the first movable portion to the platelike body attached to the object, and bring a cover member connected to the second movable portion into contact with the platelike body, and thereafter the control unit may make the tensile force of the tensile force generation unit greater than the first biasing force and less than the second biasing force to move only the first movable portion closer to the main body and detach the attraction region from the platelike body to separate the space vehicle from the object.

With such a structure, the control unit can make the tensile force of the tensile force generation unit less than the first biasing force to move the first movable portion away from the main body and attract the attraction region attached to the first movable portion to the platelike body attached to the object (i.e. capture the object by the space vehicle). At this time, the second movable portion can also be moved away from the main body to bring the cover member connected to the second movable portion into contact with the platelike body. Thereafter, the control unit can make the tensile force of the tensile force generation unit greater than the first biasing force and less than the second biasing force to move only the first movable portion closer to the main body and detach the attraction region from the platelike body to achieve static separation of the space vehicle from the object. This has at least the following two advantages. Firstly, the success rate of capturing which is the original purpose can be increased (first advantage). That is, with the static release function achieved by such a structure, even in the event of unexpected capture between the magnetic force generation unit and the platelike body, it is possible to transition to a recapture state. In the case of static separation, the relative speed and orientation disturbance during separation are low, the energy required for reapproach and recapture is small, and the operation is simple. Secondly, safety can be ensured easily (second advantage). In the case of static separation, the field of view of the sensor for the object is easily secured, so that the prediction accuracy of the relative position and orientation increases and the probability of a collision can be reduced. Even in the case where contact occurs due to miscalculation, the relative energy is small and therefore a dangerous collision is suppressed.

In the space vehicle according to the present invention, the cover member may be located at a position farther from the main body than the second movable portion is, and include a platelike portion and a plurality of tubular portions arranged along a circumference of the platelike portion. In such a case, a projection protruding toward the cover member may be provided at a distal end of the second movable portion which is an end farther from the main body and a concavity into which the projection of the second movable portion is to be fitted may be provided at a proximal end of each tubular portion of the cover member which is an end closer to the second movable portion (or a projection protruding toward the second movable portion may be provided at a proximal end of each tubular portion of the cover member and a concavity into which the projection of the cover member is to be fitted may be provided at distal end of the second movable portion). When the second movable portion is moved away from the main body, the projection of the second movable portion may be fitted into the concavity of the cover member (or the projection of the cover member may be fitted into the concavity of the second movable portion) to connect the cover member to the second movable portion.

With such a structure, when the second movable portion is moved away from the main body, the projection of the second movable portion can be fitted into the concavity of the cover member (or the projection of the cover member can be fitted into the concavity of the second movable portion). Thus, the cover member can be connected to the second movable portion without displacement.

In the space vehicle according to the present invention, the magnet support member may be attached to a support plate fixed to a distal end of the first movable portion, via the buffer elastic body. In such a case, a projection protruding toward the magnet support member in the axial direction may be provided on a surface of the support plate closer to the magnet support member and a concavity into which the projection of the support plate is to be fitted may be provided in a part of the magnet support member closer to the support plate (or a projection protruding toward the support plate may be provided in a part of the magnet support member closer to the support plate and a concavity into which the projection of the magnet support member is to be fitted may be provided on a surface of the support plate closer to the magnet support member). When the magnet support member is brought closer to the support plate, the projection of the support plate may be fitted into the concavity of the magnet support member (or the projection of the magnet support member may be fitted into the concavity of the support member) to fix a relative position and orientation of the magnet support member to the support plate.

With such a structure, after the attraction region of the space vehicle is attracted to the platelike body attached to the object (i.e. after the object is captured by the space vehicle), the magnet support member of the space vehicle can be brought closer to the support plate fixed to the distal end of the first movable portion, and the projection of the support plate can be fitted into the concavity of the magnet support member (or the projection of the magnet support member can be fitted into the concavity of the support plate). The relative position and orientation of the magnet support member with respect to the support plate can thus be fixed. This makes it possible to avoid such a situation in which the space vehicle and the object are separated by an external force and collide with each other.

The space vehicle according to the present invention may include an attraction position detection unit configured to detect whether the platelike body is attracted within the attraction region.

With such a structure, whether the platelike body is attracted within the attraction region can be detected. For example, in the case where the platelike body is attracted to part of the attraction region but is not attracted to the central part of the attraction region, it is determined that the capture may be unable to be safely maintained subsequently, and a release operation is performed to transition to a recapture operation. In the case where the platelike object is not attracted to any part of the attraction region, it is highly likely that an unexpected situation has occurred during the approach operation immediately before capture, and a decision to immediately evacuate (abort) to a safe orbit is required. Thus, this structure enables determination of whether the capture operation is successful and determination of whether to evacuate.

In the space vehicle according to the present invention, the attraction region may be an annular region defined by an inner circle having a first diameter and an outer circle having a second diameter larger than the first diameter, and the attraction position detection unit may include a plurality of inner circle position detection units arranged along the inner circle. In such a case, the space vehicle according to the present invention may include a determination unit configured to determine that the capture of the object has succeeded, in the case where the inner circle position detection units detect that the platelike body is attracted over the entire circumference of the inner circle. Instead of the inner and outer circles (two large and small circles), two large and small polygons may be used. Moreover, the determination unit may perform object capture determination by another method. For example, even in the case where the platelike body is not attracted over the entire circumference of the inner circle, if the inner circle position detection units detect that the platelike body is attracted to a part making up a specific proportion (a value set based on the requirements for the attraction force, e.g. 80%) of the entire circumference of the inner circle, the determination unit may determine that the object has been successfully captured.

With such a structure, in the case where the inner circle position detection units detect that the platelike body attached to the object is attracted over the entire circumference (or a part making up a specific proportion of the entire circumference) of the inner circle of the attraction region of the space vehicle, the determination unit can determine that the capture of the object by the space vehicle has succeeded.

In the space vehicle according to the present invention, the attraction position detection unit may include a plurality of outer circle position detection units arranged along the outer circle. In such a case, the determination unit may determine that the capture of the object has failed, in the case where the inner circle position detection units do not detect that the platelike body is attracted to at least part of the inner circle and the outer circle position detection units do not detect that the platelike body is attracted to at least part of the outer circle.

With such a structure, in the case where the inner circle position detection units do not detect that the platelike body attached to the object is attracted to at least part of the inner circle of the attraction region of the space vehicle and the outer circle position detection units do not detect that the platelike object attached to the object is attracted to at least part of the outer circle of the attraction region of the space vehicle, the determination unit can determine that the capture of the object by the space vehicle has failed.

In the space vehicle according to the present invention, the magnet support member may be a platelike member having an approximately circular shape or an approximately polygonal shape in plan view, and a hole penetrating in the axial direction may be formed in an approximately central part of the magnet support member in plan view. In such a case, the space vehicle according to the present invention may include an object detection unit configured to detect the object through the hole.

With such a structure, the central part of the magnet support member (platelike member) of the space vehicle in plan view has a hole penetrating in the axial direction, and the object detection unit detects the object through the hole. Accordingly, while the magnet support member is reciprocating in the axial direction, the object detection unit can keep catching the object (platelike body) without parallax through the hole in the central part in plan view from the moment of approach to the moment of capture. This enables capture at a high success rate.

Advantageous Effects of Invention

According to the present invention, it is possible to provide a space vehicle that, while having a relatively simple structure that can be reduced in size, can capture (and recapture) an object with no need for high-accuracy positioning.

BRIEF DESCRIPTION OF DRAWINGS

FIG. 9(A) is an explanatory diagram for explaining a case where it is difficult to determine whether capture has succeeded or failed in object capture determination using the attraction position detection unit in the space vehicle according to the embodiment of the present invention.

FIG. 9(B) is an explanatory diagram for explaining a case where it is difficult to determine whether capture has succeeded or failed in object capture determination using the attraction position detection unit in the space vehicle according to the embodiment of the present invention.

FIG. 10(A) is an explanatory diagram for explaining an object detection unit in the space vehicle according to the embodiment of the present invention, and illustrates a state in which the space vehicle is relatively far from the object.

FIG. 10(B) is an explanatory diagram for explaining the object detection unit in the space vehicle according to the embodiment of the present invention, and illustrates a state immediately before the space vehicle captures the object.

FIG. 10(C) is an explanatory diagram for explaining the object detection unit in the space vehicle according to the embodiment of the present invention, and illustrates a state immediately after the space vehicle captures the object.

DESCRIPTION OF EMBODIMENTS

Figure 1:
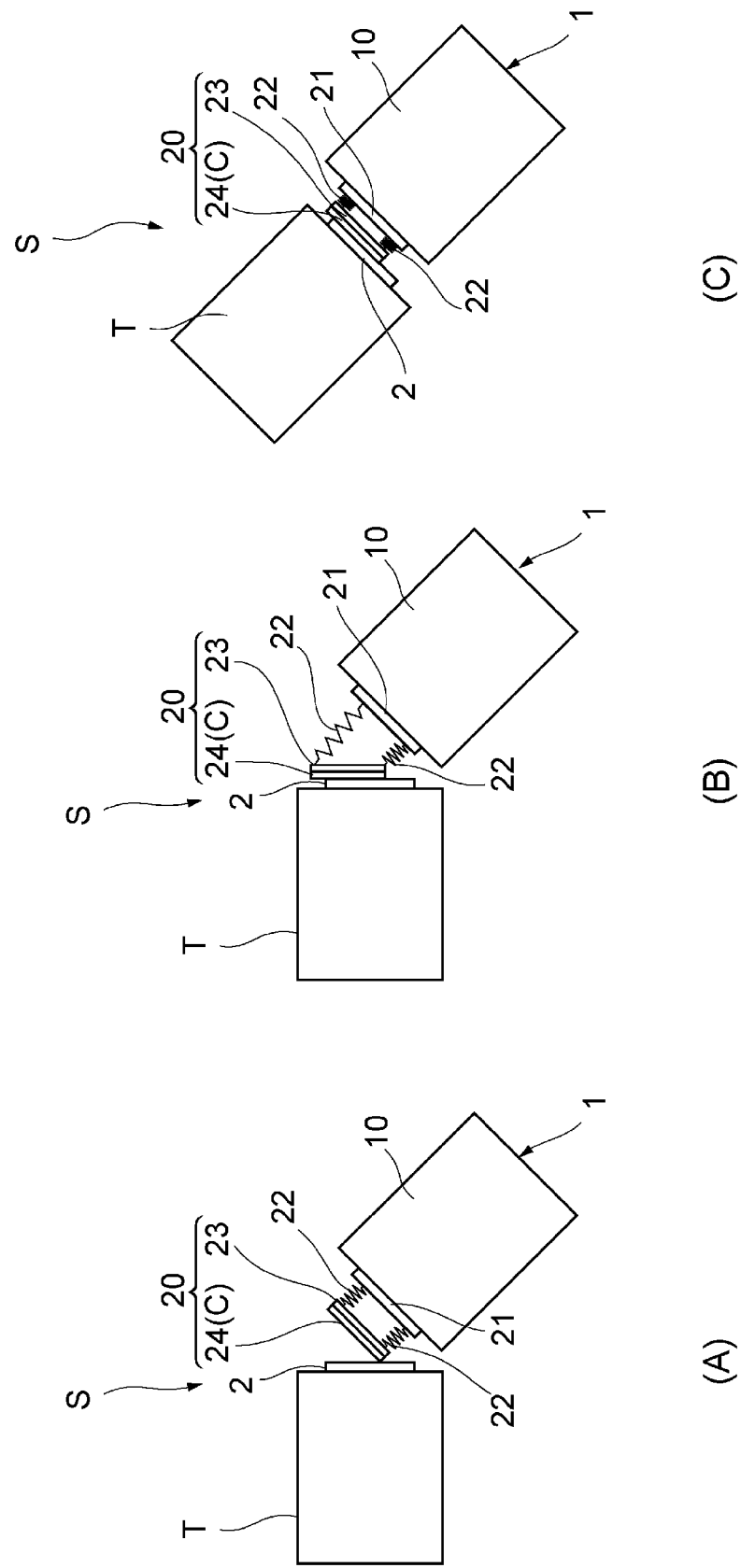
FIG. 1(A) is an explanatory diagram for explaining the structure, etc. of a capture system according to an embodiment of the present invention, and illustrates a state in which a space vehicle approaches an object.
FIG. 1(B) is an explanatory diagram for explaining the structure, etc. of the capture system according to the embodiment of the present invention, and illustrates a state in which an attraction region of a magnetic force generation unit in the space vehicle is attracted to a platelike body attached to the object.
FIG. 1(C) is an explanatory diagram for explaining the structure, etc. of the capture system according to the embodiment of the present invention, and illustrates a state in which the object is moved to the space vehicle side and fixed.

An embodiment of the present invention will be described below, with reference to the drawings.
<Capture System>

First, the structure of a capture system S according to an embodiment of the present invention will be described below. The capture system S is configured to capture an object T in outer space. As illustrated in FIG. 1(A), the capture system S includes a space vehicle 1 and a platelike body 2 attached to the object T and attracted by a magnetic force. The method of capturing the object T by the space vehicle 1 will be described in detail later with reference to FIGS. 1(A) to 1(C).

The platelike body 2 is a plate-shaped member having a predetermined planar shape (for example, a circular or rectangular shape) and a predetermined thickness, and is attached to a predetermined part (for example, a flat part) of the object T beforehand. At least part of the platelike body 2 is made of a ferromagnetic material (for example, iron, nickel, permalloy, steel, etc.), and is attracted to a magnetic force generation unit 20 (described later) in the space vehicle 1. A marker for approach navigation of the space vehicle 1 may be provided on the surface of the platelike body 2 (i.e. the surface on the space vehicle 1 side).
<Space Vehicle>

Next, the structure of the space vehicle 1 according to this embodiment will be described below, with reference to FIGS. 1 to 10.

The space vehicle 1 is configured to capture the object T by attracting the platelike body 2 by a magnetic force, and includes: a main body 10 (see FIG. 1); a first movable portion 11 (see FIG. 2, etc.); the magnetic force generation unit 20 (see FIG. 1, etc.) attached to the distal end part of the first movable portion 11 farther from the main body 10; a second movable portion 12 (see FIG. 2, etc.) to which the magnetic force generation unit 20 is not attached and that is configured to reciprocate in the axial direction with respect to the main body 10; a drive unit 30 (see FIG. 2, etc.) for moving the first movable portion 11 and the second movable portion 12; an attraction position detection unit 40 (see FIG. 8) that detects whether the platelike body 2 is attracted within a planar attraction region C (see FIG. 8) formed by permanent magnets 24 of the magnetic force generation unit 20; a determination unit (not illustrated) that determines whether the capture of the object T has succeeded or failed; and an object detection unit 50 (see FIG. 10) that detects the object T.

The main body 10 of the space vehicle 1 is a housing member having a space inside for containing various structural members. The three-dimensional shape of the main body 10 is not limited, and may be, for example, a cylindrical shape, a prismatic shape, a rectangular parallelepiped shape, a cubic shape, or the like. The size of the main body 10 is not limited as long as it can be attached to a rocket and launched into outer space. The space vehicle 1 is configured to separate from the rocket and move autonomously in outer space after being launched into outer space.

The first movable portion 11 in the space vehicle 1 is configured to reciprocate in a predetermined axial direction (the direction designated by sign A in FIG. 3) with respect to the main body 10. In this embodiment, a plurality of rodlike portions extending in the axial direction A are used as the first movable portion 11. The plurality of rodlike portions as the first movable portion 11 are arranged at predetermined intervals along the circumference of a support plate 21 (described later) of the magnetic force generation unit 20, and the distal end (the end located farther from the main body 10) of each rodlike portion is attached to a predetermined part of the back surface of the support plate 21 of the magnetic force generation unit 20. The first movable portion (rodlike portion) 11 in this embodiment is made of a rigid material such as metal, and may be circular or polygonal in cross section. The motion space of the first movable portion 11 in this embodiment is limited by a stopper or the like.

Figure 8:
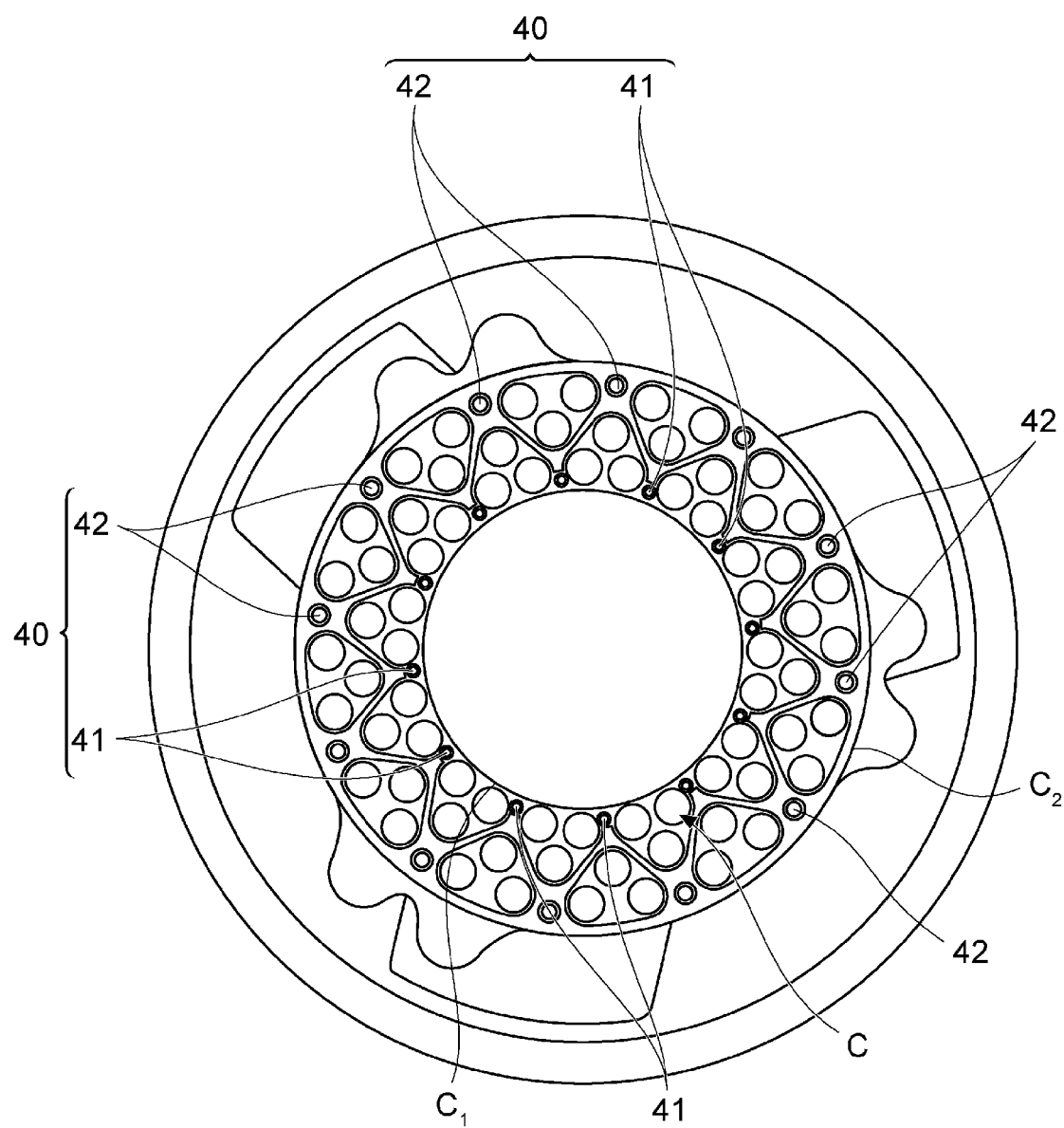
FIG. 8 is a top view for explaining an attraction position detection unit in the space vehicle according to the embodiment of the present invention.

The magnetic force generation unit 20 in the space vehicle 1 includes: a magnet support member 23 attached to the distal end of the first movable portion 11 via the support plate 21 and a buffer elastic body 22; and a plurality of permanent magnets 24 laid on the surface of the magnet support member 23 to form the planar attraction region C (see FIG. 8). The support plate 21 is a platelike member made of a rigid material such as metal, and is fixed to the distal end of the first movable portion 11. A hole 21a penetrating in the axial direction A is provided in an approximately central part of the support plate 21 in plan view, and the object detection unit 50 (see FIG. 4) can detect the object T through the hole 21a.

The buffer elastic body 22 is an elastic member (for example, a coil spring) for movably connecting the magnet support member 23 to the support plate 21. The proximal end (the end located closer to the main body 10) of the buffer elastic body 22 is attached to the front surface of the support plate 21, and the distal end (the end located farther from the main body 10) of the buffer elastic body 22 is attached to the back surface of the magnet support member 23. Thus, the support plate 21 and the magnet support member 23 are movably connected to each other via the buffer elastic body 22.

Figure 3:
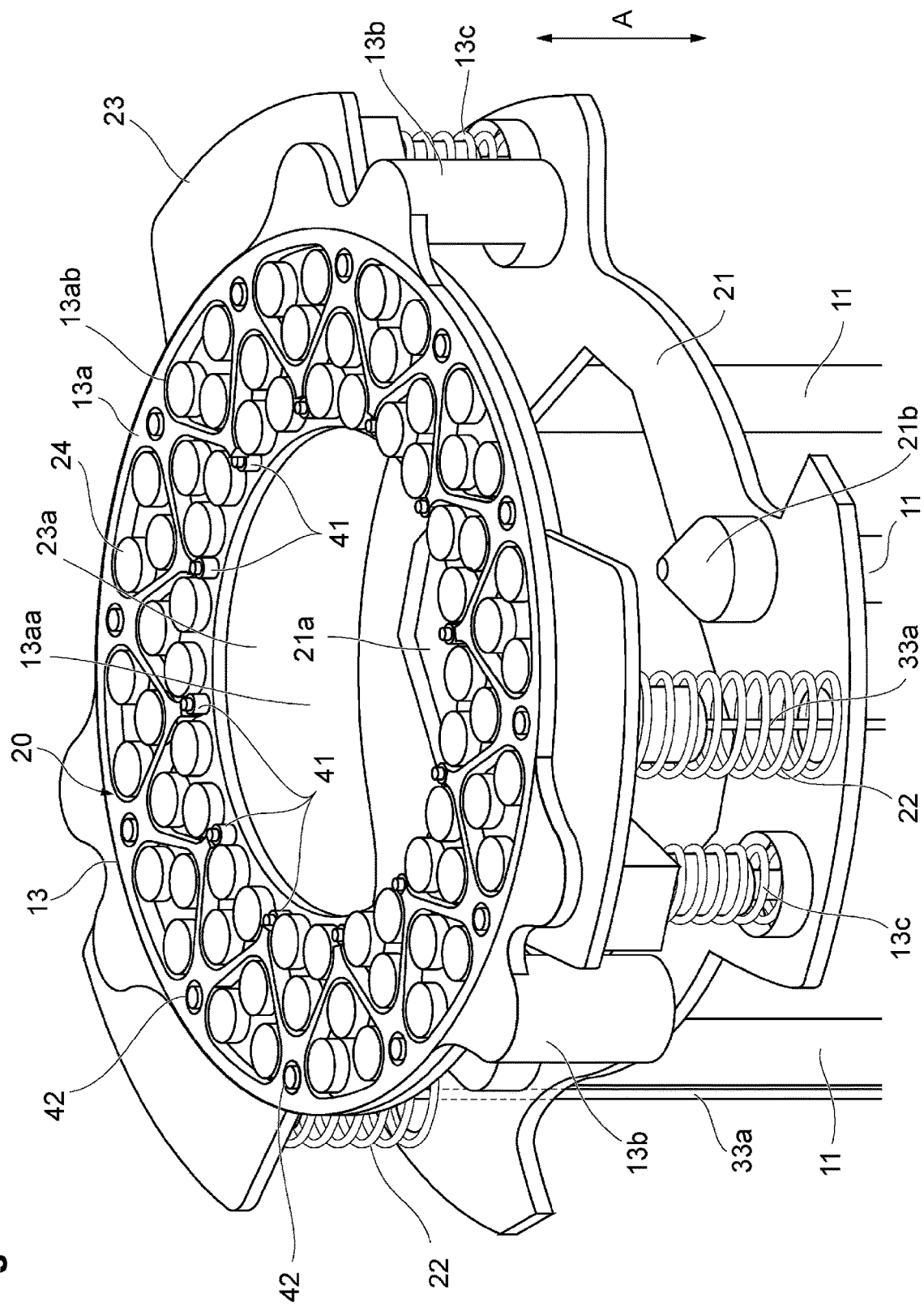
FIG. 3 is a perspective view for explaining the structure of a magnetic force generation unit, etc. in the space vehicle according to the embodiment of the present invention (illustrating a state in which permanent magnets of the magnetic force generation unit are exposed from an insertion hole of a cover member).
Figure 4:
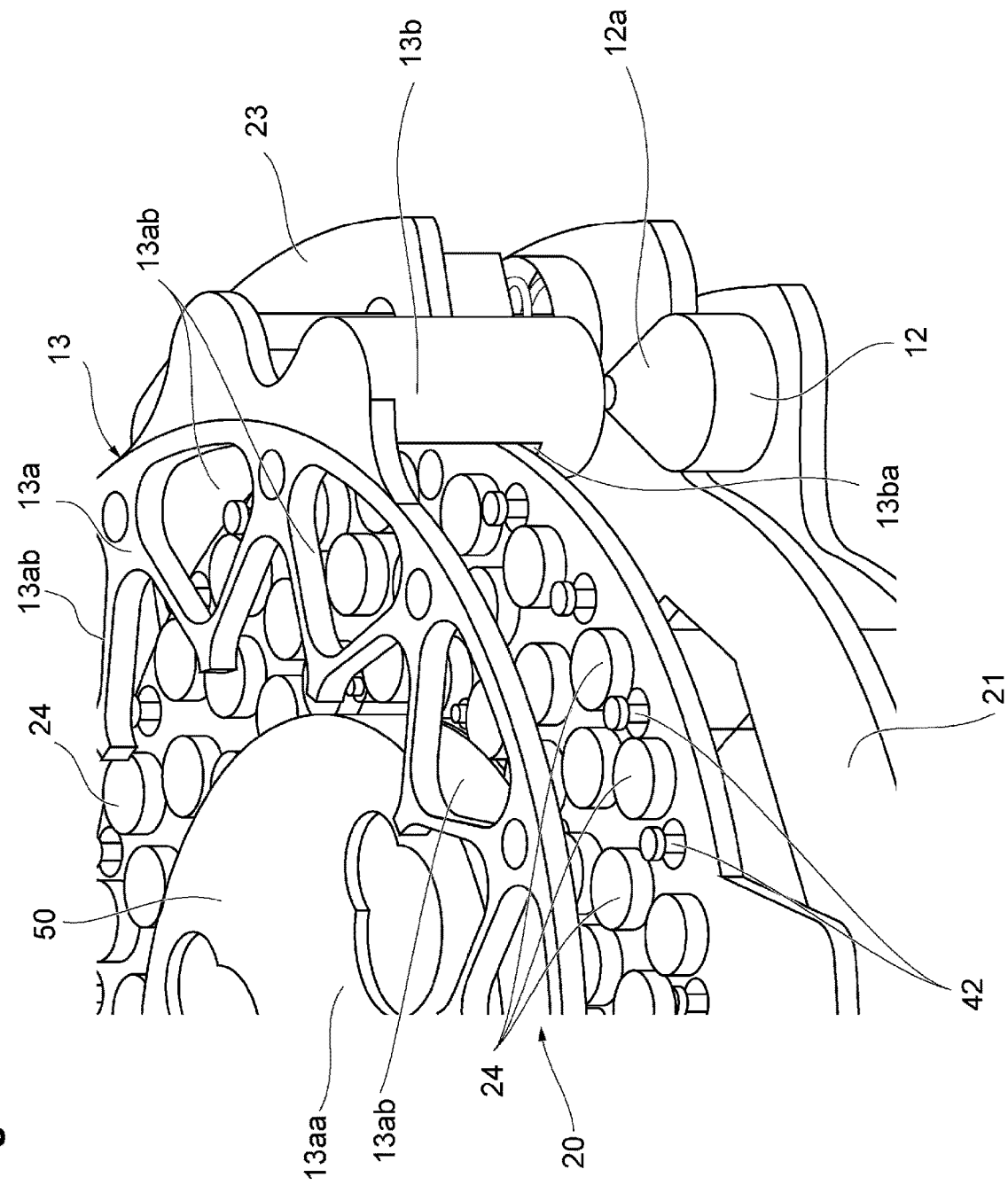
FIG. 4 is a perspective view for explaining the structure of the magnetic force generation unit, etc. in the space vehicle according to the embodiment of the present invention (illustrating a state in which the magnetic force generation unit is pulled in).
Figure 5:
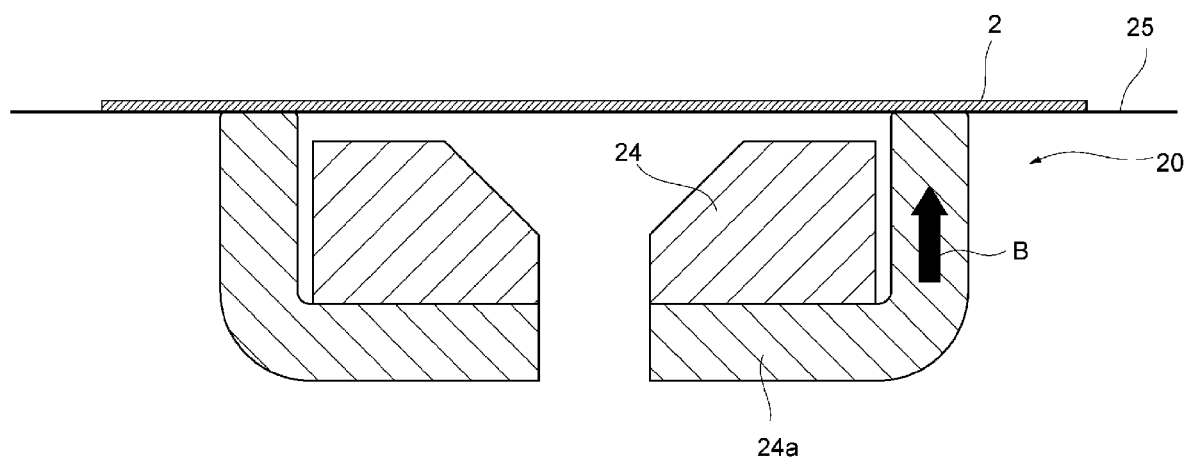
FIG. 5 is a sectional view for explaining the structure of the permanent magnets of the magnetic force generation unit in the space vehicle according to the embodiment of the present invention.

The magnet support member 23 is a platelike member made of a rigid material such as metal. As illustrated in FIG. 3, a hole 23a penetrating in the axial direction A is provided in an approximately central part of the magnet support member 23 in plan view, and the object detection unit 50 can detect the object T through the hole 23a. As illustrated in FIGS. 3 and 4, the plurality of permanent magnets 24 are laid on the front surface of the magnet support member 23, thereby forming the planar attraction region C (see FIG. 8) for attracting the object T. The attraction region C is a region of a finite area included in an attraction surface 25 illustrated in FIG. 5. In this embodiment, an annular region defined by two large and small circles (an inner circle $C_1$ and an outer circle $C_2$) is the attraction region C, as illustrated in FIG. 8. Each permanent magnet 24 is laid on the magnet support member 23 in a state of being contained in a vessel-shaped yoke 24a. Since each permanent magnet 24 is contained in the yoke 24a in this manner, the flux from each permanent magnet 24 is oriented in one direction (the direction designated by arrow B in FIG. 5). By arranging the permanent magnets 24 so that adjacent permanent magnets 24 will be opposite to each other in magnetic polarity (N/S), the magnetic field as seen from a distance beyond arrow B in FIG. 5 is canceled, minimizing the magnetic influence on the outside.

When the drive unit 30 moves the first movable portion 11 away from the main body 10 in the axial direction A, the planar attraction region C formed by the permanent magnets 24 protrudes from the main body 10 while maintaining a fixed orientation crossing (orthogonal to) the axial direction A, and is changeable in position and/or orientation by the buffer elastic body 22 in the case where an external force is applied. With such a structure, for example even in the case where the attraction region C of the space vehicle 1 approaches the platelike body 2 attached to the object T in a non-parallel state as illustrated in FIG. 1(A) or in the case where the attraction region C is displaced with respect to the platelike body 2, by changing the orientation of the attraction region C so as to be parallel to the platelike body 2 as illustrated in FIG. 1(B), a specific range (a range set from the requirements of the attraction force, e.g. 80% of the entire attraction region C) of the attraction region C can be attracted to the platelike body 2.

A projection 21b protruding toward the magnet support member 23 in the axial direction A is provided on the front surface (the surface on the magnet support member 23 side) of the support plate 21, and a concavity 23b into which the projection 21b provided on the support plate 21 is to be fitted is provided on the back surface (the surface on the support plate 21 side) of the magnet support member 23. With such a structure, when the magnet support member 23 approaches the support plate 21, the projection 21b of the support plate 21 is fitted into the concavity 23b of the magnet support member 23, so that the relative position and orientation of the magnet support member 23 with respect to the support plate 21 are fixed. The concavity and the projection may be reversed (i.e. the concavity is provided on the support plate 21 and the projection is provided on the magnet support member 23).

The second movable portion 12 in the space vehicle 1 is configured to reciprocate in the predetermined axial direction A with respect to the main body 10, as with the first movable portion 11. In this embodiment, a plurality of rodlike portions extending in the axial direction A are used as the second movable portion 12. The plurality of rodlike portions as the second movable portion 12 are arranged at predetermined intervals along the circumference of the below-described cover member 13. As illustrated in FIG. 4, a conical projection 12a is provided at the distal end (the end located farther from the main body 10) of each second movable portion 12. The projection 12a is to be fitted into a concavity 13bb (see FIG. 6) provided at the proximal end of a tubular portion 13b (described later) of the cover member 13. The second movable portion (rodlike portion) 12 in this embodiment is made of a rigid material such as metal, and may be circular or polygonal in cross section. The concavity and the projection may be reversed (i.e. the concavity is provided at the distal end of the second movable portion 12 and the projection is provided at the proximal end of the tubular portion 13b of the cover member 13). The motion space of the second movable portion 12 in this embodiment is limited by a stopper or the like.

Figure 6:
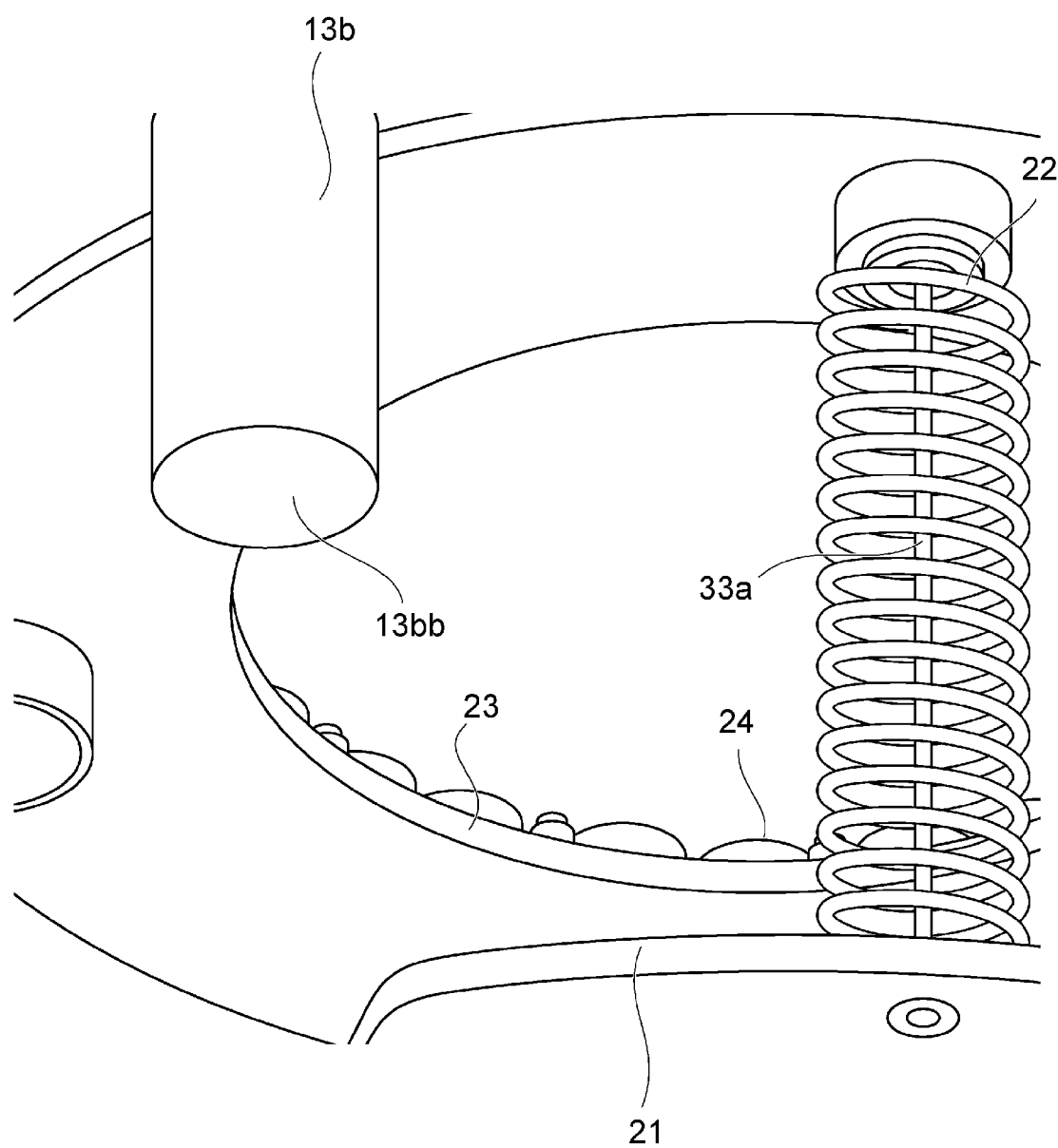
FIG. 6 is a perspective view of the cover member, etc. in the space vehicle according to the embodiment of the present invention when viewed from the main body side.

The cover member 13 is a member configured to sandwich the magnet support member 23 of the magnetic force generation unit 20 from the front and back (front side and back side), and is made of a rigid material such as metal. As illustrated in FIGS. 3 and 4, the cover member 13 includes a platelike portion 13*a* and a plurality of tubular portions 13*b* arranged along the circumference of the platelike portion 13*a*. A center hole 13*aa* penetrating in the axial direction A is provided in an approximately central part of the platelike portion 13*a* in plan view, and the object detection unit 50 can detect the object T through the center hole 13*aa*. Further, a plurality of insertion holes 13*ab* (see FIG. 4) through which the permanent magnets 24 of the magnet support member 23 located on the back side of the platelike portion 13*a* are to be inserted are provided in the platelike portion 13*a*, and the permanent magnets 24 can be exposed to the front side through these insertion holes 13*ab* (see FIG. 3). As illustrated in FIG. 4, a protrusion 13*ba* for supporting the back surface of the magnet support member 23 in contact therewith when launching the space vehicle 1 is provided near the proximal end of the tubular portion 13*b*. As illustrated in FIG. 6, a concavity 13*bb* is provided at the proximal end of the tubular portion 13*b*, and the projection 12*a* of the second movable portion 12 is fitted into the concavity 13*bb* as mentioned above.

A plurality of rods (not illustrated) having a predetermined length and extending from the cover member 13 toward the main body 10 are fixed to the back surface of the cover member 13 in a state of being arranged at predetermined intervals in the circumferential direction of the cover member 13. Each rod is inserted through insertion holes provided in the magnet support member 23 and the support plate 21, from the cover member 13 side toward the main body 10 side. The cover member 13 is connected to the magnet support member 23 via each rod and a linear bush (not illustrated). A unit composed of the cover member 13 and the magnet support member 23 is connected to the support plate 21 via the buffer elastic body 22 so as to be mutually movable. Hence, the cover member 13 can reciprocate while maintaining an orientation approximately parallel to the magnet support member 23 in a state in which a slight change in orientation (inclination) with respect to the support plate 21 is allowed. A flange member (not illustrated) is attached to the lower end of each rod. An elastic member 13*c* as illustrated in FIG. 3 is fitted into each rod between the magnet support member 23 and the flange member in a slightly compressed state, and the lower end of the elastic member 13*c* is in contact with the flange member and the upper end of the elastic member 13*c* is in contact with the back surface of the magnet support member 23. Thus, the elastic force of the elastic member 13*c* is applied to the magnet support member 23. In a state in which the tensile force generated by the below-described tensile force generation unit 33 is not applied to the magnet support member 23, the magnet support member 23 is pressed against the cover member 13 by the elastic force of the elastic member 13*c*.

Figure 2:
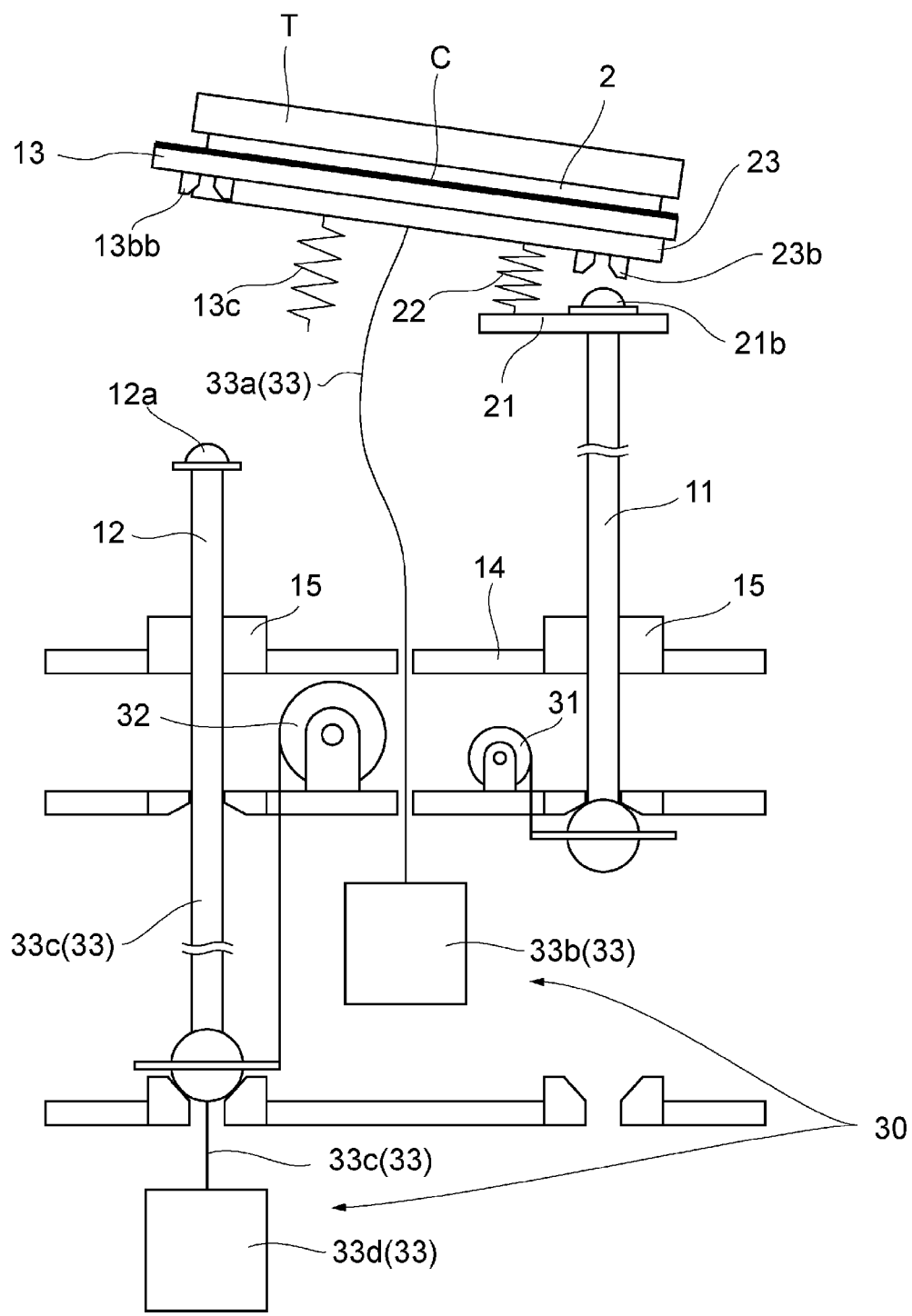
FIG. 2 is a schematic diagram for explaining the structure of a movable portion, etc. in the space vehicle according to the embodiment of the present invention.
Figure 7:
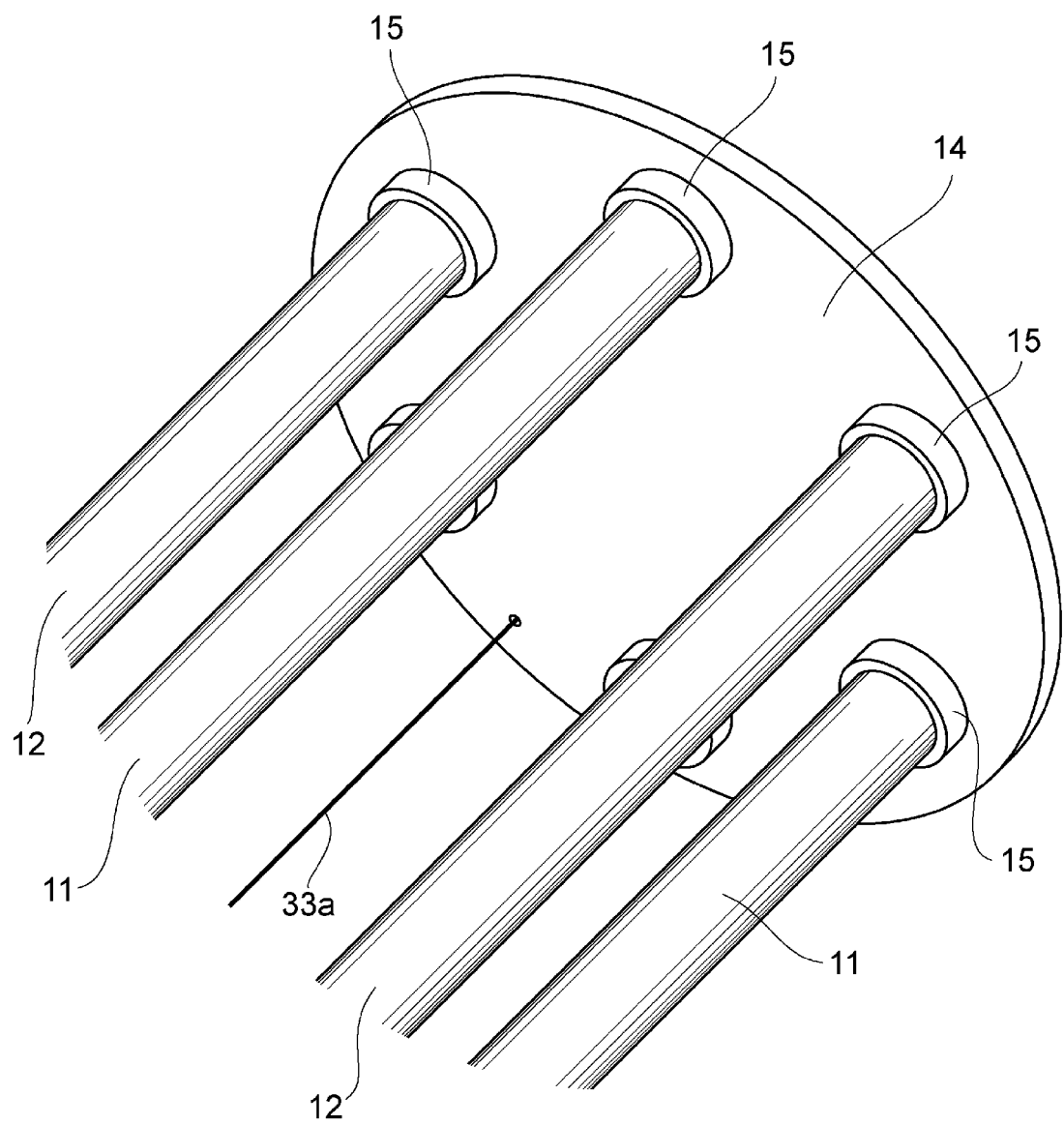
FIG. 7 is a perspective view of the movable portion and a linear bush that slidably supports the movable portion in the space vehicle according to the embodiment of the present invention, when viewed from inside the main body.

As illustrated in FIGS. 2 and 7, the first movable portion 11 and the second movable portion 12 are slidably supported by a plurality of linear bushes 15 provided along the circumference of an internal support plate 14 fixed inside the main body 10. The linear bushes 15 enable stable reciprocating movement of the first movable portion 11 and the second movable portion 12 in the axial direction A.

As illustrated in FIG. 2, the drive unit 30 includes: a first drive elastic body 31 that applies, to the first movable portion 11, a first biasing force for causing the first movable portion 11 to move away from the main body 10; a second drive elastic body 32 that applies, to the second movable portion 12, a second biasing force for causing the second movable portion 12 to move away from the main body 10; the tensile force generation unit 33 that applies, to each of the first movable portion 11 and the second movable portion 12, a tensile force against the biasing force of the corresponding one of the first drive elastic body 31 and the second drive elastic body 32; and a control unit (not illustrated) that controls the tensile force of the tensile force generation unit 33.

The first drive elastic body 31 and the second drive elastic body 32 may be any elastic bodies that can generate the first biasing force and the second biasing force respectively. For example, drum-type constant force springs may be used. In this embodiment, the second biasing force applied by the second drive elastic body 32 is set to be greater than the first biasing force applied by the first drive elastic body 31.

The tensile force generation unit 33 is configured to apply, to each of the first movable portion 11 and the second movable portion 12, a tensile force against the biasing force of the corresponding one of the first drive elastic body 31 and the second drive elastic body 32. As illustrated in FIGS. 2, 3, 6, and 7, the tensile force generation unit 33 in this embodiment includes: a plurality of ropes 33*a* connected to the back surface of the magnet support member 23; a first actuator unit 33*b* that generates a force of pulling these ropes 33*a* to the main body 10 side; a plurality of ropes 33*c* connected to the tip of the second movable portion 12; and a second actuator unit 33*d* that generates a force of pulling these ropes 33*c* to the main body 10 side. The first actuator unit 33*b* and the second actuator unit 33*d* are driven by simple open-loop control, and, if power is interrupted due to unexpected situation, can stop operation to ensure safety. Non-excitation brakes can be used as brakes for the first actuator unit 33*b* and the second actuator unit 33*d*.

As a result of the control unit making the tensile force by the first actuator 33*b* of the tensile force generation unit 33 less than the first biasing force of the first drive elastic body 31, the first movable portion 11 is moved away from the main body 10, and the permanent magnets 24 of the magnetic force generation unit 20 attached to the first movable portion 11 are inserted through the insertion holes 13*ab* of the platelike portion 13*a* of the cover member 13 and exposed to the platelike body 2 side. The attraction region C formed by the permanent magnets 24 can then be attracted to the platelike body 2 attached to the object T, thus capturing the object T. The control unit in this embodiment indirectly controls the tensile force by controlling the rotation amount of the motor of each of the first actuator unit 33*b* and the second actuator unit 33*d* to control the feed amount of each of the ropes 33*a* and 33*c*.

Moreover, as a result of the control unit making the tensile force by the second actuator 33*d* of the tensile force generation unit 33 less than the second biasing force of the second drive elastic body 32, the second movable portion 12 is also moved away from the main body 10, and the projection 12*a* provided at the distal end of the second movable portion 12 is fitted into the concavity 13*bb* of the tubular portion 13*b* of the cover member 13, and the cover member 13 is pushed up by the second movable portion 12. Consequently, the cover member 13 also moves away from the main body 10. In this embodiment, the control unit actuates the second actuator 33*d* with a significant delay from the first actuator 33*b*, to move only the first movable portion 11 away from the main body 10 and attract the attraction region C to the platelike body 2 to capture the object T. After this, the second movable portion 12 is moved away from the main body 10 to push up the cover member 13. When the attraction region C of the magnetic force generation unit 20 is attracted to the platelike body 2, a slight gap is formed between the surface of the cover member 13 and the platelike body 2.

As a result of the control unit making the tensile force by the first actuator 33b of the tensile force generation unit 33 greater than the first biasing force of the first drive elastic body 31 and the attraction force, the first movable portion 11 is moved closer to the main body 10, so that the attraction surface 25 formed by the permanent magnets 24 of the magnetic force generation unit 20 attached to the first movable portion 11 can be peeled off and separated from the platelike body 2 attached to the object T. Here, the control unit stops the second actuator 33d of the tensile force generation unit 33, maintains the feed amount at 0, and makes the second biasing force greater than the attraction force. Thus, only the first movable portion 11 is moved closer to the main body 10 while the second movable portion 12 is not moved and the surface of the cover member 13 is in close contact with the platelike body 2, as a result of which the attraction region C of the magnetic force generation unit 20 can be peeled off from the platelike body 2. Here, since the attraction region C of the magnetic force generation unit 20 attached to the first movable portion 11 separates while maintaining an approximately parallel orientation to the platelike body 2, the magnetic force can be uniformly decreased throughout the attraction region C. Safe detachment can thus be achieved.

The attraction position detection unit 40 detects whether the platelike body 2 is attracted within the attraction region C of the magnetic force generation unit 20. In this embodiment, the annular region defined by the inner circle $C_1$ having a first diameter and the outer circle $C_2$ having a second diameter larger than the first diameter is used as the attraction region C, as illustrated in FIG. 9. As illustrated in FIG. 8, the attraction region C contains the region in which the permanent magnets 24 of the magnetic force generation unit 20 are laid in plan view. The attraction position detection unit 40 in this embodiment includes: a plurality of inner circle position detection units 41 arranged along the inner circle $C_1$; and a plurality of outer circle position detection units 42 arranged along the outer circle $C_2$. The inner circle position detection units 41 and the outer circle position detection units 42 are provided on the front surface of the magnet support member 23 as illustrated in FIGS. 3 and 4, and are configured to be exposed to the object T side from the corresponding holes provided in the cover member 13 as illustrated in FIGS. 3 and 8. Although this embodiment describes an example in which an annular region formed by two large and small circles (the inner circle $C_1$ and the outer circle $C_2$) is used as the attraction region C, the planar shape of the attraction region C is not limited to such. For example, a region defined by two large and small polygons similar in planar shape may be used as the attraction region C.

The determination unit determines whether the capture of the object T has succeeded or failed based on the detection result of the attraction position detection unit 40. The determination unit in this embodiment determines that the object T has been successfully captured in the case where the inner circle position detection units 41 detect that the platelike body 2 is attracted over the entire circumference of the inner circle $C_1$. The determination unit may perform object capture determination by another method. For example, even in the case where the platelike body 2 is not attracted over the entire circumference of the inner circle $C_1$, if the inner circle position detection units 41 detect that the platelike body 2 is attracted to a part making up a specific proportion (a value set based on the requirements for the attraction force, e.g. 80%) of the entire circumference of the inner circle $C_1$, the determination unit may determine that the object T has been successfully captured. In the case where the inner circle position detection units 41 do not detect that the platelike body 2 is attracted to at least part of the inner circle $C_1$ and the outer circle position detection units 42 do not detect that the platelike body 2 is attracted to at least part of the outer circle $C_2$, the determination unit determines that the capture of the object T has failed.

In the case where a state different from the foregoing two typical states is detected, the determination unit suspends determination. For example, in the case where the inner circle position detection units 41 and the outer circle position detection units 42 detect that the platelike body 2 is partially attracted to both the inner circle $C_1$ and the outer circle $C_2$ as illustrated in FIG. 9(A) or in the case where the outer circle position detection units 42 detect that the platelike body 2 is partially attracted to only the outer circle $C_2$ as illustrated in FIG. 9(B), the determination unit transmits the detection result to ground staff and entrusts the determination to the ground staff.

The object detection unit 50 detects the object T through the hole 21a of the support plate 21, the hole 23a of the magnet support member 23, and the center hole 3aa of the platelike portion 13a of the cover member 13, as illustrated in FIG. 4.

When the space vehicle 1 is located relatively far from the object T, the magnet support member 23 and the permanent magnets 24 in the space vehicle 1 are drawn to the main body 10 side, and therefore the surface of the object detection unit 50 is located closer to the object T than the hole 23a of the magnet support member 23, as illustrated in FIGS. 4 and 10(A). Hence, a wide region including the object T can be sensed with a wide viewing angle $\theta_\alpha$, and the space vehicle 1 can approach the object T while maintaining the wide viewing angle $\theta_\alpha$, as illustrated in FIG. 10(B).

After this, when the permanent magnets 24 of the space vehicle 1 attract the platelike body 2 attached to the object T to finally capture the object T as illustrated in FIG. 10(C), the surface of the object detection unit 50 is located closer to the main body 10 than the hole 23a of the magnet support member 23 is. This causes the viewing angle of the object detection unit 50 to be relatively narrow. However, since the object T has already been captured, the viewing angle $\theta_\beta$ with which the object T can be detected suffices. Thus, even when the magnet support member 23 moves, the object detection unit 50 can keep catching the object T (the platelike body 2) through the hole 23a of the magnet support member 23 from the moment of approach to the moment of capture. This enables capture at a high success rate.

<Object Capture Method>

Next, a method of capturing the object T to which the platelike body 2 is attached using the space vehicle 1 according to this embodiment will be described below, with reference to FIG. 1, etc.

First, the space vehicle 1 is moved toward the object T. Here, the space vehicle 1 searches for the platelike body 2 attached to the object T while performing sensing by the object detection unit 50 and the like. The method of searching for the platelike body 2 is not limited. An example of the method is as follows: Light emitted from a projector attached to the space vehicle 1 is reflected by the surface of a plurality of markers attached to the surface of the platelike body 2, and the light is captured by the object detection unit 50 and recognized by a computing unit. By recognizing the relative position and orientation of the object T from, for example, the information obtained by recognizing the pattern of the plurality of markers on the surface of the platelike body 2, the space vehicle 1 can be moved to approach the object T. While the space vehicle 1 is approaching the object T, the magnet support member 23 in the space vehicle 1 is pulled into the main body 10 side by the tensile force generated by the first actuator 33b of the tensile force generation unit 33, and the back surface of the magnet support member 23 is in contact with the protrusion 13ba of the tubular portion 13b of the cover member 13, as illustrated in FIG. 4.

Next, when the distance between the object T and the space vehicle 1 has reached less than or equal to a predetermined value, the control unit in the space vehicle 1 makes the tensile force by the first actuator 33b of the tensile force generation unit 33 less than the first biasing force of the first drive elastic body 31, to move the first movable portion 11 and the magnetic force generation unit 20 attached thereto away from the main body 10. The permanent magnets 24 of the magnetic force generation unit 20 are then inserted through the insertion holes 13ab of the platelike portion 13a of the cover member 13 and exposed to the platelike body 2 side, as illustrated in FIG. 3. After this, the planar attraction region C made up of the permanent magnets 24 in the space vehicle 1 is brought closer to the platelike body 2 of the object T, as illustrated in FIG. 1(A). Here, even if the platelike body 2 is not parallel to the attraction region C as illustrated in FIG. 1(A), the buffer elastic body 22 in the space vehicle 1 can change the orientation of the attraction region C so that the attraction region C will be parallel to the platelike body 2 as illustrated in FIG. 1(B). Hence, the attraction region C can be attracted to the platelike body 2.

After this, the control unit in the space vehicle 1 makes the tensile force by the first actuator 33b of the tensile force generation unit 33 greater than that of the first drive elastic body 31, to move the first movable portion 11, the magnetic force generation unit 20 attached thereto, and the platelike body 2 and the object T attracted to the permanent magnets 24 of the magnetic force generation unit 20 closer to the main body 10, as illustrated in FIG. 1(C). The magnet support member 23 of the magnetic force generation unit 20 is then brought closer to the support plate 21, and the projection 21b of the support plate 21 is fitted into the concavity 23b of the magnet support member 23, thus fixing the relative position and orientation of the magnet support member 23 with respect to the support plate 21. As a result, the relative position and orientation of the object T with respect to the space vehicle 1 are also fixed. When the control unit in the space vehicle 1 controls the tensile force by the first actuator 33b of the tensile force generation unit 33 to pull in the magnetic force generation unit 20 to the position where the projection 21b is fitted into the concavity 23b, the control unit controls the tensile force so as not to pull in the magnetic force generation unit 20 in any further. If the magnetic force generation unit 20 is pulled in any further, the space vehicle 1 and the object T may interfere with each other or come into contact with each other.

<Object Separation Method>

Next, a method of separating the captured object T from the space vehicle 1 will be described below, with reference to FIG. 1, etc.

First, from the state illustrated in FIG. 1(C), the control unit in the space vehicle 1 makes the tensile force by the first actuator 33b of the tensile force generation unit 33 less than the first biasing force of the first drive elastic body 31, to move the first movable portion 11, the magnetic force generation unit 20 attached thereto, and the platelike body 2 and the object T attracted to the permanent magnets 24 of the magnetic force generation unit 20 away from the main body 10. The control unit also makes the tensile force by the second actuator 33d of the tensile force generation unit 33 less than the second biasing force of the second drive elastic body 32, to move the second movable portion 12 away from the main body 10. The projection 12a provided at the distal end of the second movable portion 12 is fitted into the concavity 13bb of the tubular portion 13b of the cover member 13, the cover member 13 is pushed up by the second movable portion 12, and the cover member 13 moves away from the main body 10, too. Here, the control unit actuates the second actuator 33d later than the first actuator 33b, and regulates the speed so that the second actuator 33d will not catch up with the first actuator 33b, thereby causing the second movable portion 12 to move later than the first movable portion 11.

Thereafter, the control unit in the space vehicle 1 makes the tensile force by the first actuator 33b of the tensile force generation unit 33 greater than the first biasing force of the first drive elastic body 31 and the attraction force. Meanwhile, the control unit stops the second actuator 33d of the tensile force generation unit 33, and sets the feed amount to 0. Thus, only the first movable portion 11 is moved closer to the main body 10 while the second movable portion 12 is not moved and the surface of the cover member 13 is in close contact with the platelike body 2. Consequently, the attraction region C of the magnetic force generation unit 20 attached to the first movable portion 11 separates while maintaining an approximately parallel orientation to the platelike body 2, so that the magnetic force can be uniformly decreased throughout the attraction region C. The attraction region C can therefore be safely detached from the platelike body 2.

<Effects>

In the space vehicle 1 according to the embodiment described above, when the drive unit 30 moves the first movable portion 11 away from the main body 10 in the axial direction A, the attraction region C of the magnetic force generation unit 20 formed by laying the plurality of permanent magnets 24 on the tip part (the surface opposite to the main body 10) of the magnet support member 23 can protrude from the main body 10 while maintaining a fixed orientation (orientation crossing the axial direction A). Moreover, the attraction region C is changeable in position and/or orientation by the buffer elastic body 22 interposed between the first movable portion 11 and the magnet support member 23, in the case where an external force is applied. Therefore, even in the case where the attraction region C of the space vehicle 1 approaches the platelike body 2 attached to the object T in a non-parallel state or in the case where the attraction region C is displaced (i.e. misaligned) with respect to the platelike body 2 (assuming that the misalignment between the space vehicle 1 and the platelike body 2 is within a predetermined range), by changing the orientation of the attraction region C so as to be parallel to the platelike body 2, a specific range (a range set from the requirements of the attraction force, e.g. 80% of the entire attraction region C) of the attraction region C can be attracted to the platelike body 2. Hence, the space vehicle 1 can capture the object T with no need for high-accuracy positioning of the attraction region C of the space vehicle 1 with respect to the platelike body 2 attached to the object T. In addition, since the space vehicle 1 according to the embodiment is configured to capture the object T by causing the attraction region C of the magnetic force generation unit 20 to attract to the platelike body 2 attached to the object T, the space vehicle 1 is capable of recapture, and also its structure is relatively simple and can be reduced in size.

In the space vehicle 1 according to the embodiment described above, the control unit can make the tensile force of the tensile force generation unit 33 less than the first biasing force of the first drive elastic body 31 to move the first movable portion 11 away from the main body 10, and make the tensile force of the tensile force generation unit 33 greater than the first biasing force of the first drive elastic body 31 to move the first movable portion 11 closer to the main body 10. That is, the first movable portion 11 can be easily reciprocated simply by controlling the tensile force of the tensile force generation unit 33 by the control unit.

In the space vehicle 1 according to the embodiment described above, the control unit can make the tensile force of the tensile force generation unit 33 less than the first biasing force to move the first movable portion 11 away from the main body 10 and attract the attraction region C attached to the first movable portion 11 to the platelike body 2 attached to the object T (i.e. capture the object T by the space vehicle 1). At this time, the second movable portion 12 can also be moved away from the main body 10 to bring the cover member 13 connected to the second movable portion 12 into contact with the platelike body 2. Thereafter, the control unit can make the tensile force of the tensile force generation unit 33 greater than the first biasing force and less than the second biasing force to move only the first movable portion 11 closer to the main body 10 and detach the attraction region C from the platelike body 2 to achieve static separation of the space vehicle 1 from the object T. This has at least the following two advantages. Firstly, the success rate of capturing which is the original purpose can be increased (first advantage). That is, with the static separation function achieved by such a structure, even in the event of unexpected capture between the magnetic force generation unit 20 and the platelike body 2, it is possible to transition to a recapture state. In the case of static separation, the relative speed and orientation disturbance during separation are low, the energy required for reapproach and recapture is small, and the operation is simple. Secondly, safety can be ensured easily (second advantage). In the case of static separation, the field of view of the sensor for the object T is easily secured, so that the prediction accuracy of the relative position and orientation increases and the probability of a collision can be reduced. Even in the case where contact occurs due to miscalculation, the relative energy is small and therefore a dangerous collision is suppressed.

In the space vehicle 1 according to the embodiment described above, when the second movable portion 12 is moved away from the main body 10, the projection 12a of the second movable portion 12 can be fitted into the concavity 13bb of the cover member 13. Thus, the cover member 13 can be connected to the second movable portion 12 without displacement.

In the space vehicle 1 according to the embodiment described above, after the attraction region C is attracted to the platelike body 2 attached to the object T (i.e. after the object T is captured by the space vehicle 1), the magnet support member 23 can be brought closer to the support plate 21, and the projection 21b of the support plate 21 can be fitted into the concavity 23b of the magnet support member 23. The relative position and orientation of the magnet support member 23 with respect to the support plate 21 can thus be fixed. As a result, the relative position and orientation of the object T with respect to the space vehicle 1 can be fixed. This makes it possible to avoid such a situation in which the space vehicle 1 and the object T are separated by an external force and collide with each other.

In the space vehicle 1 according to the embodiment described above, whether the platelike body 2 is attracted within the attraction region C (the annular region defined by the inner circle $C_1$ having a first diameter and the outer circle $C_2$ having a second diameter larger than the first diameter) can be detected. In detail, in the case where the inner circle position detection units 41 detect that the platelike body 2 is attracted over the entire circumference (or a part making up a specific proportion of the entire circumference) of the inner circle $C_1$, the determination unit of the attraction position detection unit 40 in the space vehicle 1 can determine that the capture of the object T has succeeded. For example, in the case where the inner circle position detection units 41 and the outer circle position detection units 42 detect that the platelike body 2 is partially attracted to the outer circle $C_2$ but the platelike body 2 is not attracted to the inner circle $C_1$ at all, the determination unit can entrust the determination of whether the capture is successful, to ground staff. Having referenced such detection results, the ground staff determines that the docking may be unable to be safely maintained subsequently, and a release operation is performed to transition to a recapture operation. In the case where the inner circle position detection units 41 do not detect that the platelike body 2 is attracted to at least part of the inner circle $C_1$ and the outer circle position detection units 42 do not detect that the platelike body 2 is attracted to at least part of the outer circle $C_2$, the determination unit can determine that the capture of the object T by the space vehicle 1 has failed. In the case where the platelike body 2 is not attracted to any part of the attraction region C, it is highly likely that an unexpected situation has occurred during the approach operation immediately before capture, and a decision to immediately evacuate (abort) to a safe orbit is required. Thus, this structure enables determination of whether the capture operation is successful and determination of whether to evacuate.

In the space vehicle 1 according to the embodiment described above, the central part of the magnet support member 23 in plan view has the hole 23a penetrating in the axial direction A, and the object detection unit 50 detects the object T through the hole 23a. Accordingly, while the magnet support member 23 is reciprocating in the axial direction A, the object detection unit 50 can keep catching the object T (platelike body 2) without parallax through the hole 23a in the central part in plan view from the moment of approach to the moment of capture. This enables capture at a high success rate.

The present invention is not limited to the foregoing embodiments, and any design modifications made by those skilled in the art to the embodiments are also included in the scope of the present invention as long as they have the features according to the present invention. The elements included in the foregoing embodiments and their arrangements, materials, conditions, shapes, sizes, etc. are not limited to those described above and can be changed as appropriate. In addition, the elements included in the foregoing embodiments can be combined as long as it is technically possible, and such combinations are also included in the scope of the present invention as long as they have the features according to the present invention.

REFERENCE SIGNS LIST 1 space vehicle
2 platelike body 10 main body
11 first movable portion
12 second movable portion
12a projection (of second movable portion)
13 cover member
13a platelike portion
13b tubular portion
13bb concavity (of tubular portion)
20 magnetic force generation unit
21 support plate
21b projection (of support plate)
22 buffer elastic body
23 magnet support member
23a hole
23b concavity (of magnet support member)
24 permanent magnet
30 drive unit
31 first drive elastic body
32 second drive elastic body
33 tensile force generation unit
40 attraction position detection unit
41 inner circle position detection unit
42 outer circle position detection unit
50 object detection unit
A axial direction
C attraction region
$C_1$ inner circle
$C_2$ outer circle
S capture system
T object

What is claimed is:

1. A space vehicle configured to capture an object in outer space by attracting, by a magnetic force generated by a magnetic force generation unit, a platelike body that is attached to the object and is attracted by a magnetic force, the space vehicle comprising:
a main body;
a movable portion configured to reciprocate in a predetermined axial direction with respect to the main body;
a drive unit configured to move the movable portion;
the magnetic force generation unit attached to a distal end of the movable portion which is an end farther from the main body,
wherein the magnetic force generation unit includes: a magnet support member attached to the distal end of the movable portion via a buffer elastic body; and a plurality of permanent magnets laid on a tip part of the magnet support member to form a planar attraction region, and
wherein when the drive unit moves the movable portion away from the main body in the axial direction, the attraction region of the magnetic force generation unit protrudes from the main body while maintaining a fixed orientation crossing the axial direction, and is changeable in position and/or orientation by the buffer elastic body in the case where an external force is applied;
an attraction position detection unit configured to detect whether the platelike body is attracted within the attraction region; and
a determination unit configured to determine that the capture of the object has succeeded, in the case where the attraction position detection unit detects that the platelike body is attracted to a part making up a specific proportion of the attraction region.

2. The space vehicle according to claim 1, wherein the drive unit includes: a drive elastic body configured to apply, to the movable portion, a predetermined biasing force for causing the movable portion to move away from the main body; a tensile force generation unit configured to apply, to the movable portion, a tensile force against the biasing force of the drive elastic body; and a control unit configured to control the tensile force of the tensile force generation unit, and
wherein the control unit makes the tensile force of the tensile force generation unit less than the biasing force of the drive elastic body to move the movable portion away from the main body, and makes the tensile force of the tensile force generation unit greater than the biasing force of the drive elastic body to move the movable portion closer to the main body.

3. The space vehicle according to claim 2, wherein the movable portion is a first movable portion,
wherein the drive elastic body is a first drive elastic body configured to apply a first biasing force to the first movable portion,
wherein the space vehicle comprises:
a second movable portion to which the magnetic force generation unit is not attached and that is configured to reciprocate in the axial direction with respect to the main body; and
a second drive elastic body configured to apply, to the second movable portion, a second biasing force for causing the second movable portion to move away from the main body,
wherein the second biasing force is greater than the first biasing force, and
wherein the control unit makes the tensile force of the tensile force generation unit less than the first biasing force to move the first movable portion and the second movable portion away from the main body, attract the attraction region attached to the first movable portion to the platelike body attached to the object, and bring a cover member connected to the second movable portion into contact with the platelike body, and thereafter the control unit makes the tensile force of the tensile force generation unit greater than the first biasing force and less than the second biasing force to move only the first movable portion closer to the main body and detach the attraction region from the platelike body to separate the space vehicle from the object.

4. The space vehicle according to claim 3, wherein the cover member is located at a position farther from the main body than the second movable portion is, and includes a platelike portion and a plurality of tubular portions arranged along a circumference of the platelike portion,
wherein a projection protruding toward the cover member is provided at a distal end of the second movable portion which is an end farther from the main body,
wherein a concavity into which the projection of the second movable portion is to be fitted is provided at a proximal end of each tubular portion of the cover member which is an end closer to the second movable portion, and
wherein when the second movable portion is moved away from the main body, the projection of the second movable portion is fitted into the concavity of the cover member to connect the cover member to the second movable portion.

5. The space vehicle according to claim 3, wherein the cover member is located at a position farther from the main body than the second movable portion is, and includes a platelike portion and a plurality of tubular portions arranged along a circumference of the platelike portion, wherein a projection protruding toward the second movable portion is provided at a proximal end of each tubular portion which is an end closer to the second movable portion, wherein a concavity into which the projection of the cover member is to be fitted is provided at a distal end of the second movable portion which is an end farther from the main body, and wherein when the second movable portion is moved away from the main body, the projection of the cover member is fitted into the concavity of the second movable portion to connect the cover member to the second movable portion.

6. The space vehicle according to claim 3, wherein the magnetic support member is attached to a support plate fixed to a distal end of the first movable portion, via the buffer elastic body, wherein a projection protruding toward the magnet support member in the axial direction is provided on a surface of the support plate closer to the magnet support member, wherein a concavity into which the projection of the support plate is to be fitted is provided in a part of the magnet support member closer to the support plate, and wherein when the magnet support member is brought closer to the support plate, the projection of the support plate is fitted into the concavity of the magnet support member to fix a relative position and orientation of the magnet support member to the support plate.

7. The space vehicle according to claim 3, wherein the magnetic support member is attached to a support plate fixed to a distal end of the first movable portion, via the buffer elastic body, wherein a projection protruding toward the support plate is provided on a part of the magnet support member closer to the support plate, wherein a concavity into which the projection of the magnet support member is to be fitted is provided on a surface of the support plate closer to the magnet support member, and wherein when the magnet support member is brought closer to the support plate, the projection of the magnet support member is fitted into the concavity of the support plate to fix a relative position and orientation of the magnet support member to the support plate.

8. The space vehicle according to claim 1, wherein the attraction region is an annular region defined by an inner circle having a first diameter and an outer circle having a second diameter larger than the first diameter, wherein the attraction position detection unit includes a plurality of inner circle position detection units arranged along the inner circle, and the part making up a specific proportion of the attraction region comprises an entire circumference of the inner circle.

9. The space vehicle according to claim 8, wherein the attraction position detection unit includes a plurality of outer circle position detection units arranged along the outer circle, and wherein the determination unit determines that the capture of the object has failed, in the case where the inner circle position detection units do not detect that the platelike body is attracted to at least part of the inner circle and the outer circle position detection units do not detect that the platelike body is attracted to at least part of the outer circle.

10. The space vehicle according to claim 1, wherein the magnet support member is a platelike member having an approximately circular shape or an approximately polygonal shape in plan view, wherein a hole penetrating in the axial direction is formed in an approximately central part of the magnet support member in plan view, and wherein the space vehicle comprises: an object detection unit configured to detect the object through the hole.

11. A capture system comprising:

a platelike body that is attached to an object in outer space and is attracted by a magnetic force; and the space vehicle according to claim 1, wherein the capture system is configured to capture the object by the space vehicle.

* * * * *